(12) United States Patent
Lenneman et al.

(10) Patent No.: US 7,340,333 B2
(45) Date of Patent: Mar. 4, 2008

(54) MULTIFUNCTION CONTROL SYSTEM

(75) Inventors: John K. Lenneman, Okemos, MI (US); Joseph F. Szczerba, Grand Blanc, MI (US); Adrian B. Chernoff, Boulder, CO (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/559,534

(22) Filed: Nov. 14, 2006

(65) Prior Publication Data

US 2007/0069914 A1   Mar. 29, 2007

Related U.S. Application Data

(63) Continuation-in-part of application No. 11/189,117, filed on Jul. 25, 2005.

(60) Provisional application No. 60/591,121, filed on Jul. 26, 2004.

(51) Int. Cl.
*G05B 11/01* (2006.01)
*G05B 15/00* (2006.01)
*G06F 7/00* (2006.01)
*G06F 3/00* (2006.01)

(52) U.S. Cl. .................. 701/36; 700/17; 700/83; 715/700

(58) Field of Classification Search .......... 700/17, 700/83; 701/36; 715/700
See application file for complete search history.

(56) References Cited

U.S. PATENT DOCUMENTS 5,821,935 A * 10/1998 Hartman et al. ............ 715/839
6,009,355 A * 12/1999 Obradovich et al. ............ 701/1
6,369,717 B1 * 4/2002 Damiani et al. ........ 340/815.4
6,812,942 B2 * 11/2004 Ribak ........................ 345/30
6,819,990 B2 * 11/2004 Ichinose ..................... 701/36
6,842,677 B2 * 1/2005 Pathare ...................... 701/36
2004/0176880 A1 * 9/2004 Obradovich et al. ........... 701/1
2006/0106522 A1 * 5/2006 Obradovich ................. 701/96

OTHER PUBLICATIONS

2003 Audi Nuvolari Quatro Concept vehicle pictures. Found using Google search engine . . . ☐☐☐☐10 pages. It is noted that the 10th page is a larger version of the first picture depicted on p. 1 . . . this picture shows the MMI utilized in the vehicle . . . .*
Artcile showing that the 2003 Audi Nuvolari Quatro Concept was shown at the Geneva International Motor Show in 2003 . . . ☐☐☐4 pages . . . .*
Press release from Mar. 18, 2003 outlining the details of the 2003 Geneva International Motor Show stating that the show ended on Sunday Mar. 16th, 2003.☐☐☐☐1 page . . . .*
McCullough et al., "New 12-Cylinder W12. W Stands for Wow," www.automotive.com, downloaded Jul. 21, 2005.
Brauer, "Why iDrive Won't Fly," www.edmunds.com, downloaded Jul. 21, 2005.
"Audi MMI Quick Reference Guide" published by Audi of America, as WSA 243 562 721 21, Nov. 2003, copyright 2003.

* cited by examiner

*Primary Examiner*—Ronald Hartman, Jr.

(57) ABSTRACT

A control system for a vehicle with a plurality of selectively variable characteristics includes a first button depressible to cause a first mode of operation and a second button depressible to cause a second mode of operation. In the first mode of operation, a rotary dial is rotatable to cause variation of the first characteristic. In the second mode of operation, the rotary dial is rotatable to cause variation of the second characteristic. The control system thus enables a single dial to control multiple characteristics or multiple vehicle systems, which enables a corresponding reduction in the quantity of switches and other control input devices in a vehicle passenger compartment.

14 Claims, 6 Drawing Sheets

MULTIFUNCTION CONTROL SYSTEM

CROSS REFERENCE TO RELATED APPLICATION

This application is a continuation in part of U.S. patent application Ser. No. 11/189,117 filed Jul. 25, 2005, which is hereby incorporated by reference in its entirety, and which claims the benefit of U.S. Provisional Patent No. 60/591,121, filed Jul. 26, 2004, and which is hereby incorporated by reference in its entirety.

TECHNICAL FIELD

This invention relates to multifunction control systems wherein rotation of a dial in a first mode of operation varies a first characteristic and rotation of the dial in a second mode of operation varies a second characteristic.

BACKGROUND OF THE INVENTION

A motor vehicle typically includes a multitude of components and systems that enhance the comfort and convenience of the driver and passengers. Such systems include, for example, audio systems having a radio, speakers, compact disc player, and cassette player; climate systems having heating, ventilation, and air conditioning components; navigational systems; etc.

Each of the systems typically includes an interface through which the driver of the vehicle can interact with the system. For example, control of a system requires that the driver of the vehicle input command information via the interface to which the system is responsive to vary a system characteristic. Each system may also supply information to the driver via the interface. For example, an audio system will indicate the radio station to which it is tuned, a climate control system will indicate the fan speed or the thermostat setting, and a navigational system will indicate location information.

Each system typically includes its own dedicated interface. Thus, for example, a climate control system includes a plurality of switches, buttons, dials, etc. that are operable to control only the climate control system. Similarly, an audio system includes a plurality of switches, buttons, dials, etc. that are operable only to control the audio system.

SUMMARY OF THE INVENTION

A control apparatus for a vehicle characterized by first, second, third, and fourth variable characteristics are provided. The control apparatus includes first and second buttons being selectively depressible, a first dial and a second dial. The first and second dials are selectively rotatable about a common axis. A controller is operatively connected to the first and second buttons and to the dial.

The control apparatus is configured such that depressing the first button causes the controller to operate in a first mode in which rotation of the first dial causes the controller to alter the first variable characteristic, and in which rotation of the second dial causes the controller to alter the second variable characteristic. The control apparatus is also configured such that depressing the second button causes the controller to operate in a second mode in which rotation of the first dial causes the controller to alter the third variable characteristic, and rotation of the second dial causes the controller to alter the fourth variable characteristic.

Thus, the dials are reconfigurable to control multiple vehicle systems or multiple variable characteristics, effectively reducing the number of input devices in a vehicle cockpit. The control apparatus thus provides increased interior styling options compared to the prior art by reducing the styling constraints imposed by a large quantity of input devices. By reducing the number of input devices in a vehicle cockpit, the multifunction control apparatus may also improve human-vehicle interaction by enabling input devices that are situated in preferred locations within easy reach of the driver to control more vehicle systems.

Examples of vehicle systems include a climate system having variable characteristics such as air temperature, fan speed, and air flow mode; an audio system having variable characteristics such as radio tuner frequency, volume, compact disc track playing; a navigational system having variable characteristics such as point of interest selected, address selected, programmable vehicle destination information, etc.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
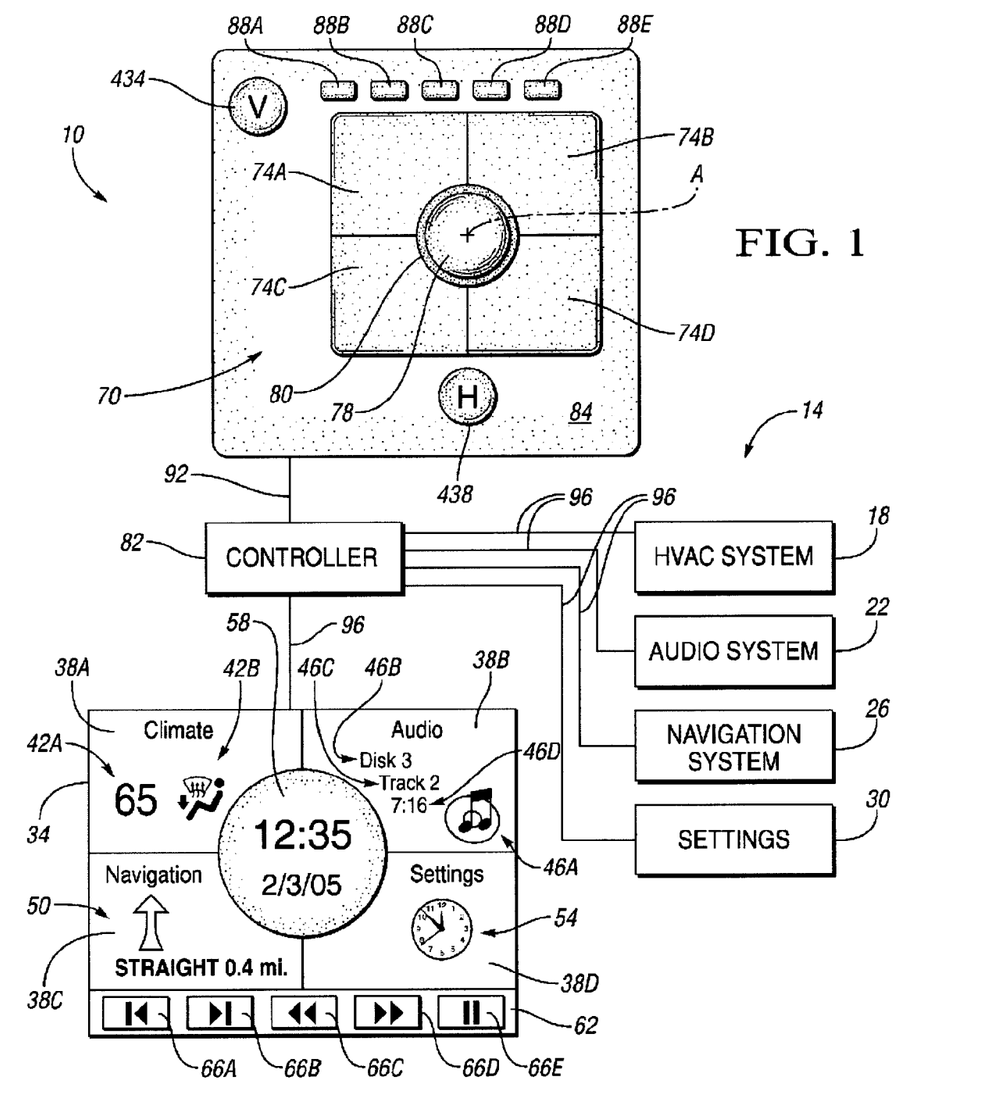
FIG. 1 is a schematic depiction of a vehicle with vehicular systems and a control system with buttons, rotary dials, and a display for controlling the vehicular systems.

Referring to FIG. 1, a control system 10 for a vehicle 14 is schematically depicted. The vehicle 14 includes a climate system 18, an audio system 22, a navigation system 26, and a driver information system 30. Each of systems 18, 22, 26, 30 is characterized by selectively variable system characteristics. In an exemplary embodiment, the audio system 22 includes components such as a radio, tape player, compact disk player, and speakers. In an exemplary embodiment, the climate system 18 includes components such as an air conditioner for providing cooled air, a heater for providing heated air, and ducts and vents for providing the heated or cooled air to the vehicle passenger compartment (not shown). The ducts are configured to selectively provide air to a first set of vents below an instrument panel, to a second set of vents formed inside the instrument panel and positioned to direct air generally rearward, and a third set of vents formed in the instrument panel and positioned to direct air to a windshield for use in defrosting, as understood by those skilled in the art.

The control system 10 includes a display 34 divisible into quadrants 38A, 38B, 38C and 38D. Each quadrant is dedicated to the display of information pertaining to a respective one of the vehicle systems 18, 22, 26, 30 when the control system 10 is in a base mode of operation. More specifically, quadrant 38A displays icons 42A, 42B indicative of the status of variable characteristics of the climate control system 18. Icon 42A is a numeric icon indicating the temperature of air being injected into the passenger compartment of the vehicle by the climate system 18. Icon 42B is an icon indicating the present airflow mode of the climate system 18, i.e., from which set of vents air is being injected into the passenger compartment.

Quadrant 38B displays icons 46A, 46B, 46C, 46D indicative of the status of variable characteristics of the audio system 22. Icon 46A is indicative of the general source from which the audio system 22 is receiving audio content which, in FIG. 1, is a schematic depiction of a compact disk to indicate that the audio system 22 is obtaining audio content from a compact disk player. Icons 46B, 46C, 46D are alphanumeric representation of the specific source of audio content. Icon 46B indicates which of several stored compact disks is playing. Icon 46C indicates which track of the compact disk is playing. Icon 46D indicates, in minutes and seconds, the portion of the track that is being played.

Quadrant 38C displays icon 50 indicative of variable characteristics of the navigation system 26. Icon 50 in FIG. 1 depicts textual instructions for the direction and distance in which to travel for the driver of the vehicle to reach a desired destination. Icon 50 also includes an arrow indicating the desired direction of travel. Quadrant 38D displays icon 54 indicative of present driver information system settings which, in FIG. 1, is the time to which the vehicle clock is set.

The display depicts a circular window 58 that is situated between the quadrants 38A-D. When the driver of the vehicle is not interacting with the control system, i.e., in the base mode, the window 58 displays a clock including time and date as shown in FIG. 1. A rectangular section 62 of the display 34 is situated underneath or below the quadrants 38A-D. Section 62 includes a plurality of icons 66A-E arranged linearly within section 62. In FIG. 1, each of icons 66A-E is representative of a respective compact disk player command or function. Icon 66A represents a command to play the previous track of the compact disk playing in the audio system; icon 66B represents a command to play the next track of the compact disk playing in the audio system; icon 66C represents a command to "rewind" the compact disk playing in the audio system; icon 66D represents a command to "fast forward" the compact disk playing in the audio system; and icon 66E represents a command to "pause" the compact disk playing in the audio system. Those skilled in the art will recognize and understand the compact disk commands and functions represented by icons 66A-E.

The display 34 is sufficiently located within the vehicle for viewing by a driver or passenger. Exemplary display locations include the vehicle instrument panel, gauge cluster, heads up display, base of windshield, A-pillar, etc.

The control system 10 further includes an input interface 70 consisting of buttons and rotary dials. The input interface 70 is preferably located on the center console of the vehicle. However, those skilled in the art will recognize a variety of other appropriate locations at which the input interface 70 may be located within the vehicle within the scope of the claimed invention. For example, the input interface 70 may be on a steering wheel, instrument panel, etc.

Figure 1A:
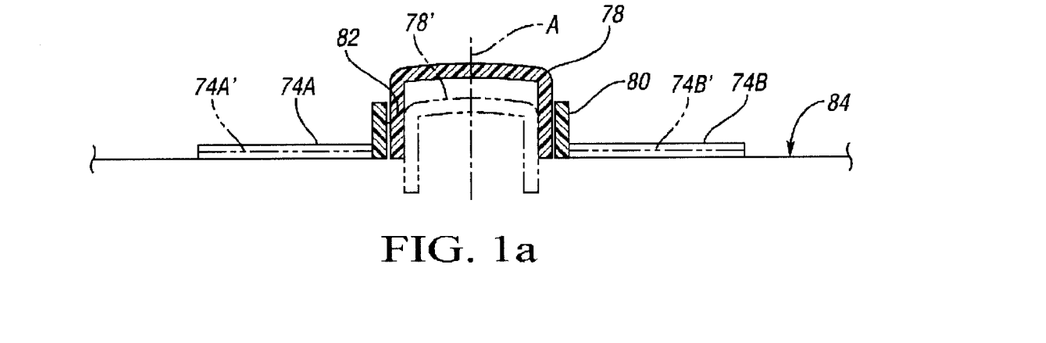
FIG. 1a is a schematic elevational view of the dials of FIG. 1.

The input interface 70 includes four buttons 74A-D that are arranged in the same spatial relationship to one another as the quadrants 38A-D in the display 34. The interface 70 also includes an inner rotary dial 78 and an outer rotary dial 80. The inner and outer rotary dials 78, 80 are arranged concentrically about axis A and have the same spatial relationship with respect to buttons 74A-D as the spatial relationship window 58 has with respect to quadrants 38A-D. Buttons 74A-D protrude from surface 84, and are selectively depressible. Referring to FIG. 1a, buttons 74A and 74B are depicted in their respective depressed positions at 74A' and 74B'. The inner dial 78 protrudes farther from surface 84 than outer dial 80, and is selectively depressible to a depressed position shown at 78'. Outer dial 80 defines an annular aperture 82 through which inner dial 78 extends. Outer dial 80 also has a larger radial dimension from the axis A than inner dial 78. The direction of travel of buttons 74A-D from their respective nondepressed positions to their respective depressed positions is parallel to the axis of rotation A of dials 78, 80. Referring again to FIG. 1, buttons 74A-D and dial 80 are biased in their respective nondepressed positions. Dials 78, 80 are selectively rotatable about axis A.

The input interface 70 further includes a plurality of push buttons 88A-E arranged linearly, each corresponding to a respective one of the functions represented by the icons in section 62 of the display 34, which, in FIG. 1, are icons 66A-E.

The control system 10 includes a controller 82 configured to receive input signals 92 from the interface 70, and configured to transmit control signals 96 to the display 34, the climate control system 18, the audio system 22, the navigational system 26, and the driver information system 30 so that the control system 10 functions as described herein.

Each of the four buttons 74A-D is depressible to cause the control system 10 to operate in a respective one of at least four modes of operation. In each of the four modes of operation, inner and outer dials 78, 80 are rotatable to effect a change in a different characteristic. More specifically, depressing button 74A causes the control system 10 to operate in a first mode in which the inner dial 78 is rotatable to vary a first characteristic of the climate system and the outer dial 80 is rotatable to vary a second characteristic of the climate system. Accordingly, button 74A is sometimes referred to herein as the "climate system button." Depressing button 74B causes the control system to operate in a second mode in which the inner dial 78 is rotatable to vary a first characteristic of the audio system and the outer dial 80 is rotatable to vary a second characteristic of the audio system. Accordingly, button 74B is sometimes referred to herein as the "audio system button." Depressing button 74C causes the control system to operate in a third mode in which the inner dial 78 is rotatable to vary a first characteristic of the navigational system and the outer dial 80 is rotatable to vary a second characteristic of the navigational system. Accordingly, button 74C is sometimes referred to herein as the "navigation system button." Depressing button 74D causes the control system to operate in a fourth mode in which the inner dial 78 is rotatable to vary a first characteristic of the driver information system and the outer dial 80 is rotatable to vary a second characteristic of the driver information system. Accordingly, button 74D is sometimes referred to herein as the "driver information system button."

It should be noted that depressing one of the buttons for an extended period of time, or depressing one of the buttons multiple times, may also cause the control system to enter other modes of operation in which the dials 78, 80 are rotatable to vary other characteristics.

It may be desirable to employ an audio output device to provide audio feedback to the driver. The audio output device would be operatively connected to the controller such that the audio output device generates sounds, such as chimes or beeps, in response to the manipulation of the buttons and dials.

In each mode of operation, the window 58 may display icons representative of the characteristics that are variable by rotation of the inner and outer dials. Accordingly, the appearances of the icons change in response to the rotation of the inner or outer dial to indicate the change or variation in the characteristic caused by the rotation.

Different icons may be depicted in section 62 of the display in each of the different modes to indicate various settings to which yet another variable characteristic may be set by depressing a corresponding one of buttons 88A-E. Thus, for example, in the base mode shown in FIG. 1, depressing one of buttons 88A-E will cause the compact disk player to perform the function or command represented by the corresponding icon 66A-E.

Figure 2:
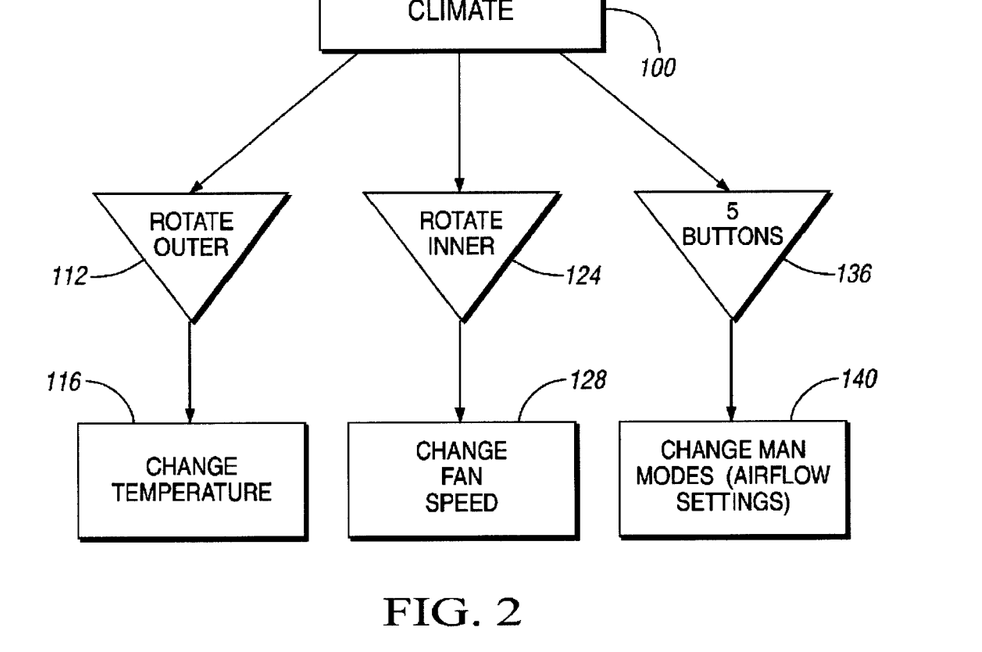
FIG. 2 is a flow diagram depicting an exemplary control program for the control system of FIG. 1 in a first operating mode.

Exemplary operations of the control system will now be presented. Referring to FIGS. 1 and 2, button 74A is a dedicated climate system button; thus, depressing button 74A at step 100 will cause the control system 10 to operate in the first mode of operation that enables the driver or passenger of the vehicle to modify or change variable characteristics of the climate system.

Figure 3:
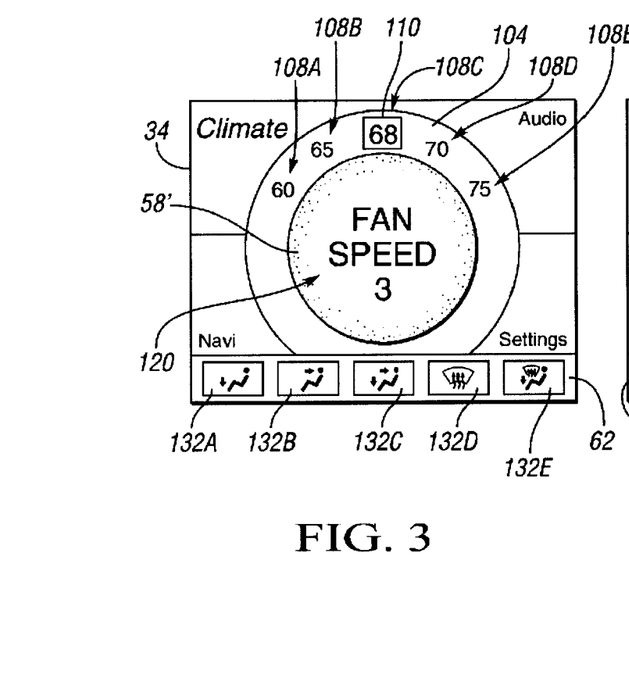
FIG. 3 is a schematic depiction of the display of FIG. 1 in the first operating mode.

In response to button 74A being depressed at step 100, the controller 82 causes the display 34 to remove the icons shown in quadrants 38A-D, and to display circular window 58' surrounded by concentric ring 104, as shown in FIG. 3. Referring to FIGS. 2 and 3, icons 108A-E appear in ring 104. Each of icons 108A-E is a numeric indicator of an air temperature, in degrees Fahrenheit. A box 110 surrounds the icon 108A-E most closely representing the temperature at which the climate system injects air into the passenger compartment. In FIG. 3, the box 110 surrounds icon 108C; thus, the climate system injects air at 68 degrees Fahrenheit.

Rotating the outer dial at step 112 causes the controller 82 to transmit a signal to the climate system; the climate system is responsive to the signal to vary the temperature of air being injected into the vehicle passenger compartment at step 116. More specifically, rotation of the outer dial in one direction causes the air temperature to increase; rotation of the outer dial in the opposite direction causes the air temperature to decrease. Box 110 moves in response to the rotation at step 112 to surround the icon most closely representing the temperature at which air is injected into the passenger compartment. Thus, for example, if the air temperature is decreases to 65 degrees as a result of outer dial rotation at step 112, the box 110 will surround icon 108B, which is "65."

Icon 120, depicted inside window 58', is an alphanumeric indicator of the climate system fan speed. Rotating the inner dial at step 124 causes alteration of the fan speed at step 128, and thereby causes variation in the volume and speed of air entering the vehicle passenger compartment via the ducts and vents. More specifically, rotation of the inner dial in one direction at step 124 causes a decrease in the fan speed; rotation of the inner dial in the opposite direction at step 124 causes an increase in the fan speed. Icon 120 is responsive to rotation of the inner dial at step 124. Thus, for example, icon 120 may read "FAN SPEED 2" to indicate a lower fan speed, and may read "FAN SPEED 4" to indicate a higher fan speed.

Section 62 of display 34 displays air flow mode icons 132A-E. The push buttons 88A-E are depressible to select an air flow mode. Air flow modes correspond to locations at which air is injected into the passenger compartment. The icons 132A-E represent predefined or preselected air flow mode statuses. Icon 132A represents an air flow mode in which are is injected through the first set of vents under the instrument panel; icon 132B represents an air flow mode in which air is injected through the second set of vents formed in the instrument panel and directed generally rearward in the passenger compartment; icon 132C represents an air flow mode in which air is injected into the passenger compartment through both the first and second sets of vents; icon 132D represents an air flow mode in which air is directed toward the windshield through the third set of vents for defrosting; and icon 132E represents an air flow mode in which air is directed through the first and third sets of vents.

By depressing a corresponding push button (shown at 88A-E in FIG. 1), an air flow mode may be selected. The buttons 88A-E are arranged in generally the same spatial relationship to one another as the icons 132A-E in section 62. Depressing one of the buttons 88A-E at step 136 will change the air flow mode at step 140 to the air flow mode represented by the icon that is in a corresponding spatial relationship in section 62. Thus, depressing button 88A will cause the air flow mode to change to that which is represented by icon 132A, depressing button 88B will cause the air flow mode to change to that which is represented by icon 132B, depressing button 88C will cause the air flow mode to change to that which is represented by icon 132C, depressing button 88D will cause the air flow mode to change to that which is represented by icon 132D, and depressing button 88E will cause the air flow mode to change to that which is represented by icon 132E.

Figure 4:
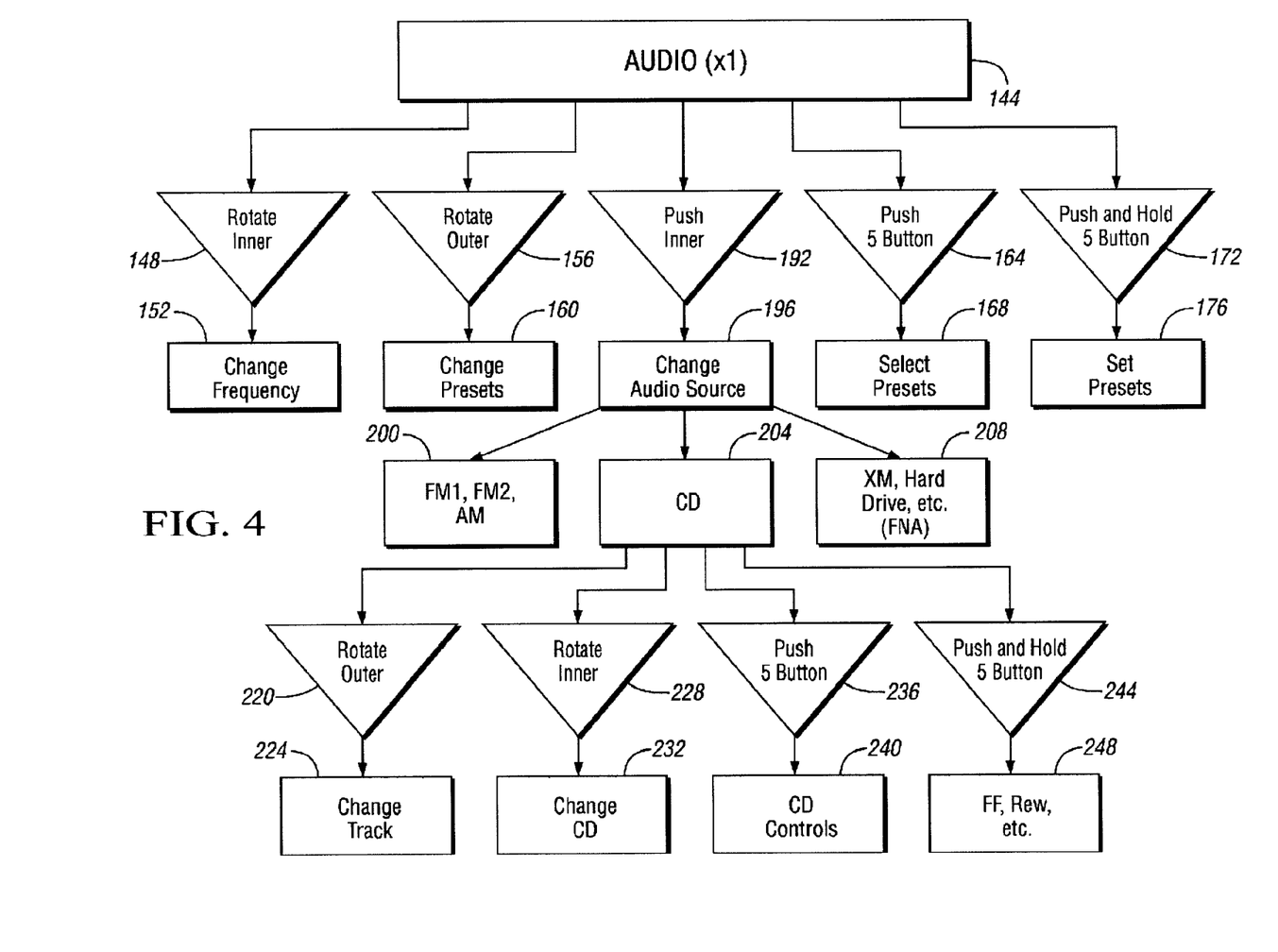
FIG. 4 is a flow diagram depicting an exemplary control program for the control system of FIG. 1 in a second operating mode.

Referring to FIG. 4, depressing the audio system button once at step 144 causes the control system to operate in a second mode of operation wherein the inner and outer dials are rotatable to control, i.e., to vary or alter, audio system characteristics. Rotating the outer dial at step 148 causes the controller to alter the radio frequency to which the audio system is tuned at step 152. More specifically, rotating the outer dial in one direction will increase the frequency to which the audio system is tuned, and rotating the outer dial in the opposite direction will decrease the frequency to which the audio system is tuned. Rotating the inner dial at step 156 causes the controller to alternate between different radio frequencies stored in memory (i.e., "preset" stations) at step 160.

In the second mode of operation, the buttons shown at 88A-88E in FIG. 1 are each selectively depressible (step 164) to cause the controller to change to a respective preset station at step 168. Depressing one of the buttons shown at 88A-88E for longer than a predetermined duration at step 172 causes the frequency to which the audio system is tuned to be stored in memory as a preset station at step 176, and the button is thereafter depressible at step 164 to cause the audio system to tune to the station.

Figure 5:
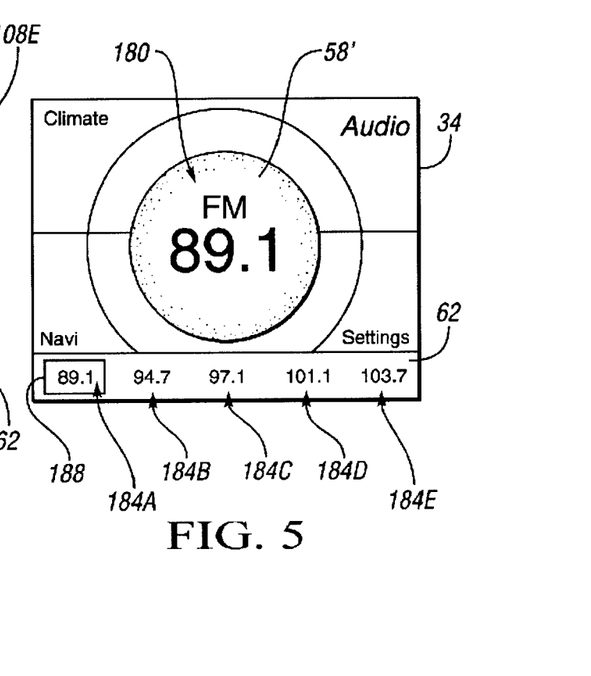
FIG. 5 is a schematic depiction of the display of FIG. 1 in the second operating mode.

After the audio system button is depressed once at step 144, the controller causes the appearance of the display 34 to change, as shown in FIG. 5. Referring to FIGS. 4 and 5, window 58' displays indicia 180 of the audio source to which the audio system is tuned, which, in FIG. 5, is the radio band and the frequency to which the audio system is tuned. Indicia 180 is responsive to manipulation of the dials and push buttons at steps 148, 156, and 164 to indicate the frequency to which the audio system is tuned. Section 62 includes icons 184A-E that are numeric representations of predefined values for the frequency to which the radio is tunable, i.e., the frequencies of preset stations that are selectable at steps 156 and 164. Each of the stations represented by icons 184A-E corresponds to one of the push buttons shown at 88A-E in FIG. 1.

Thus, depressing button 88A at step 164 causes the audio system to tune to the frequency represented by icon 184A, depressing button 88B at step 164 causes the audio system to tune to the frequency represented by icon 184B, depressing button 88C at step 164 causes the audio system to tune to the frequency represented by icon 184C, depressing button 88D at step 164 causes the audio system to tune to the frequency represented by icon 184D, and depressing button 88E at step 164 causes the audio system to tune to the frequency represented by icon 184E.

Similarly, when a new preset station is set in step 176, one of the icons 184A-E changes to indicate the new preset station. Box 188 surrounds the icon 184A-E representing the preset station selected at steps 156 and 164.

Referring specifically to FIG. 4, depressing the inner dial at step 192 causes the controller to alter the band or audio source (e.g., a compact disk player) from which the audio system receives audio content at step 196. Thus, pressing the inner dial once will cause the audio system to select the AM band, and pressing the inner dial twice will cause the audio system to select the FM band at step 200. Pressing the inner dial three times will cause the audio system to select the compact disk player at step 204, and pressing the inner dial more than three times will cause the audio system to select one or more other sources, such as satellite radio, a hard disk drive, etc, at step 208.

Figure 6:
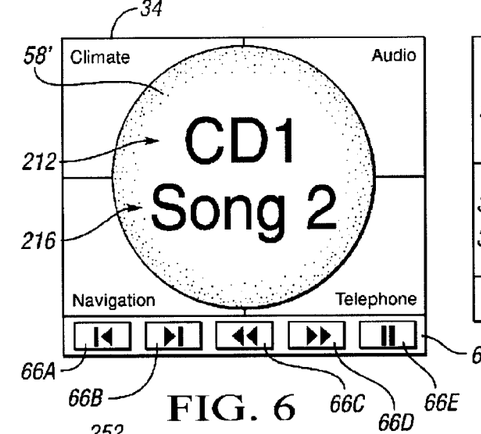
FIG. 6 is a schematic depiction of the display of FIG. 1 in a submode of the second operating mode.

When the compact disk player is selected at step 204, the display changes as shown in FIG. 6. Referring to FIGS. 5 and 6, window 58' depicts icon 212, which is an alphanumeric representation of which of several compact disks stored in the audio system is playing. Window 58' also depicts icon 216, which is an alphanumeric representation of which track of the compact disk shown in icon 212 is playing.

Rotating the outer dial at step 220 causes the controller to alter the compact disk track being played at step 224, with a corresponding change to icon 216. Rotating inner dial at step 228 causes the controller to alter which of several compact disks stored in the audio system is played at step 232, with a corresponding change to icon 212. Depressing one of the buttons shown at 88A-E in FIG. 1 at step 236 causes the audio system to alter the compact disk track playing at step 240 according to a respective one of the commands represented by icons 66A-E in section 62. Depressing one of the buttons for longer than a predetermined time period at step 244 causes the command to continue at step 248 until the button is released. Thus, for example, if button 88C corresponds to the "rewind" command, represented by icon 66C, then holding button 88C in the depressed position will cause the audio system to "rewind" the compact disk until button 88C is released from the depressed position.

Figure 7:
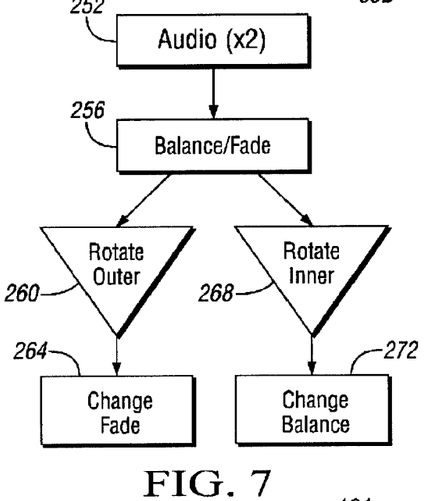
FIG. 7 is a flow diagram depicting an exemplary control program for the control system of FIG. 1 in a third operating mode.

Referring to FIG. 7, depressing the audio system button twice at step 252 causes the control system to operate in a third mode of operation at step 256 in which rotating the outer dial (step 260) causes the audio system to adjust the level of fade at step 264, and in which rotating the inner dial (step 268) causes the audio system to adjust the balance at step 272. Those skilled in the art will recognize that "balance" refers to the difference in volume between left and right speakers within the passenger compartment, and that "fade" refers to the difference in volume between front and rear speakers within the passenger compartment. In the third mode, the display depicts icons representative of the balance and fade levels (not shown). The appearance of the icons representative of the balance and fade levels are responsive to rotation of the inner and outer dials at steps 260 and 268.

Figure 8:
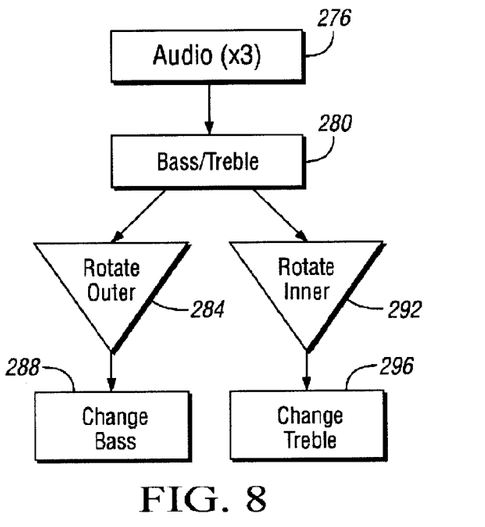
FIG. 8 is a flow diagram depicting an exemplary control program for the control system of FIG. 1 in a fourth operating mode.

Referring to FIG. 8, depressing the audio system button three times at step 276 causes the control system to operate in a fourth mode of operation at step 280 in which rotating the outer dial (step 284) causes a change in the bass level (step 288) of the audio system speakers, and in which rotating the inner dial (step 292) causes a change in the treble level (step 296) of the audio system speakers.

Figure 9:
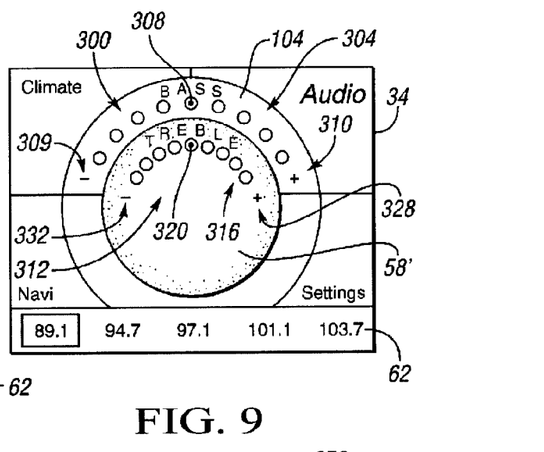
FIG. 9 is a schematic depiction of the display of FIG. 1 in the fourth operating mode.

Referring to FIG. 9, when in the fourth mode of operation, the display 34 depicts icon 300 in ring 104. Icon 300 includes an alphanumeric indicator "BASS" and a plurality of circles 304. A dot 308 is shown in one of the plurality of circles to indicate the bass level selected. The controller is configured to alter icon 300 in response to rotation of the outer dial at step 284. More specifically, rotation of the outer dial in one direction at step 284 causes a decrease in bass and a corresponding movement of dot 308 leftward to a circle closer to the "−" indicator 309. Rotation of outer dial in the other direction at step 284 causes an increase in bass and a corresponding movement of dot 308 rightward to a circle closer to the "+" indicator 310.

The display 34 also depicts icon 312 in window 58'. Icon 312 includes an alphanumeric indicator "TREBLE" and a plurality of circles 316. A dot 320 is shown in one of the plurality of circles to indicate the treble level selected. The controller is configured to alter icon 312 in response to rotation of the inner dial at step 292. More specifically, rotation of the inner dial in one direction at step 292 causes a decrease in treble and a corresponding movement of dot 320 leftward to a circle closer to the "−" indicator 332. Rotation of inner dial in the other direction at step 292 causes an increase in treble and a corresponding movement of dot 320 rightward to a circle closer to the "+" indicator 328.

Figure 10:
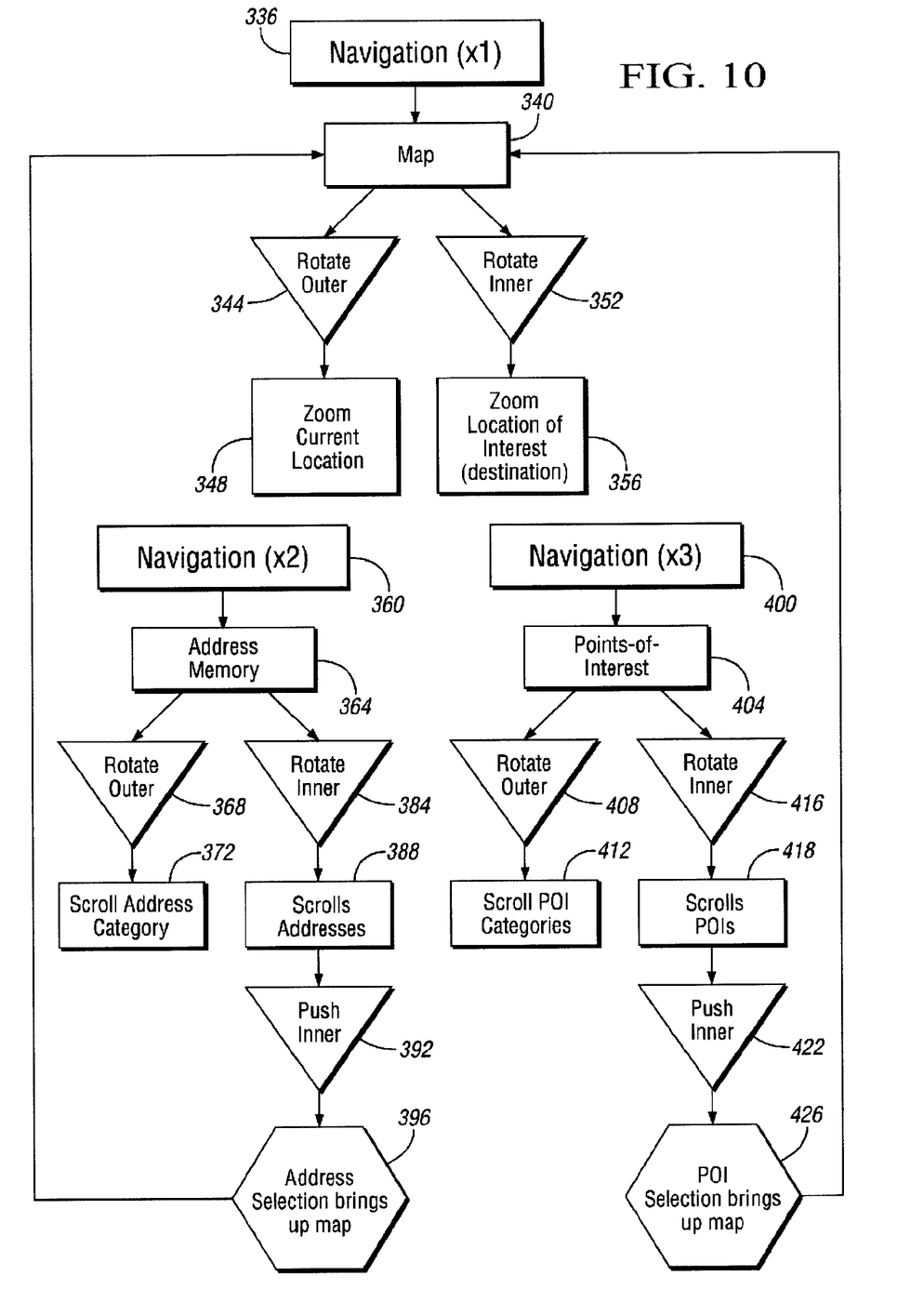
FIG. 10 is a flow diagram depicting an exemplary control program for the control system of FIG. 1 in fifth, sixth, and seventh operating modes.

Referring to FIG. 10, depressing the navigation system button once (step 336) causes a fifth mode of control system operation at step 340. In the fifth mode, the controller causes the display to depict a map (not shown), which shows the present location of the vehicle and a user-selected location of interest. Rotating the outer dial at step 344 causes the display to "zoom" the vehicle's present location on the map (step 348). Rotating the inner dial at step 352 causes the display to "zoom" the selected location of interest on the map (step 356).

Figure 11:
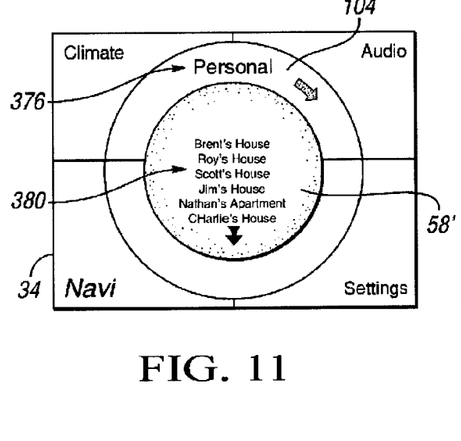
FIG. 11 is a schematic depiction of the display of FIG. 1 in the sixth operating mode.

Depressing the navigation system button twice (step 360) causes the control system to operate in a sixth mode at step 364 in which addresses stored in memory are available for selection. Rotating the outer dial at step 368 causes variation at step 372 in which of several predefined address categories is selected. Referring to FIG. 11, when in the sixth mode, the display 34 depicts icon 376 in ring 104, which indicates which address category is selected. When one of the categories is selected via rotation of the outer dial at step 368, indicia 380 in window 58' is a list of addresses stored by the navigation system within the category selected at steps 368 and 372. Referring to FIGS. 10 and 11, rotating the inner dial at step 384 causes variation at step 388 in which of the addresses shown in list 380 is selectable by depressing the inner dial at step 392. By depressing the inner dial at step 392, a map is shown on the display 34 at step 396 to indicate the location of the address selected at step 392. Steps 344 and 348 may then be performed to zoom the map generated at step 396.

Depressing the navigation system switch three times (step 400) causes the control system to operate in a seventh mode at step 404 in which points of interest stored in memory are available for selection. Rotating the outer dial at step 408 causes variation at step 412 in which of several point of interest categories is selected. Exemplary point of interest categories include fuel, lodging, food, etc. The display 34 depicts an icon (not shown) in ring 104 that indicates which of the point of interest categories is selected. When one of the categories is selected via rotation of the outer dial at step 408, a list (not shown) of points of interest within the selected category appears in window 58'. Rotating the inner dial at step 416 causes variation at step 418 in which of the points of interest shown in the list is selectable by depressing the inner dial at step 422. By depressing the inner dial at step 422, a map is shown on the display 34 at step 426 to indicate the location of the point of interest selected at step 422. Steps 344 and 348 may then be performed to zoom the map generated at step 426.

Figure 12:
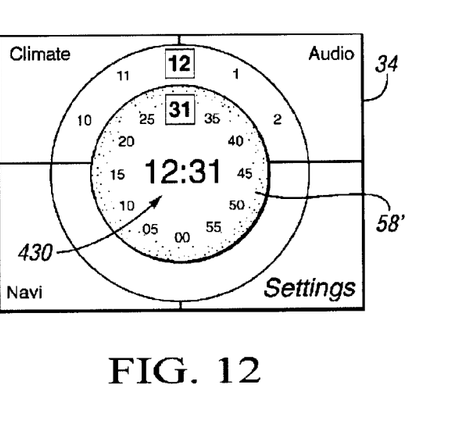
FIG. 12 is a schematic depiction of the display of FIG. 1 in an eighth operating mode; and, FIG. 13 is a schematic depiction similar to FIG. 1, but showing another embodiment in which a control system has gesture pads, with rotary dials, and a display for controlling the vehicular systems.

Referring to FIG. 12, an eighth mode of operation occurs when the driver information system button is depressed. The display 34 depicts icon 430 inside window 58'. Icon 430 is a numerical indication of the time to which the vehicle clock set. In the eighth mode of operation, rotating the outer dial alters the hour to which the clock is set. Rotating the inner dial alters the minutes for which the clock is set. Icon 430 is responsive to rotation of the inner and outer dials.

In a preferred embodiment, the amount of change in a variable characteristic is proportional to the amount of rotation of the corresponding switch. In a preferred embodiment, when a category or element in a list is "selected or selectable by performing another step, the controller causes the representation on the display 34 corresponding to the category or element to be highlighted, i.e., visually differentiated from the other categories or elements such as by size, color, etc.

Referring again to FIG. 1, dial 434 is selectively rotatable to alter the volume of the audio system speakers, and button 438 is selectively depressible to return the control system 10 and display 34 to the base mode and main screen as shown in FIG. 1. It should be noted that at least a portion of quadrants 38A-38D remain on the display in the first, second, third, fourth, fifth, sixth, seventh, and eighth modes of operation, as shown in FIGS. 3, 5, 6, 9, 11, and 12. The text "Climate," "Audio," "Navi," and "Settings" remains on the display in the respective quadrants.

Figure 13:
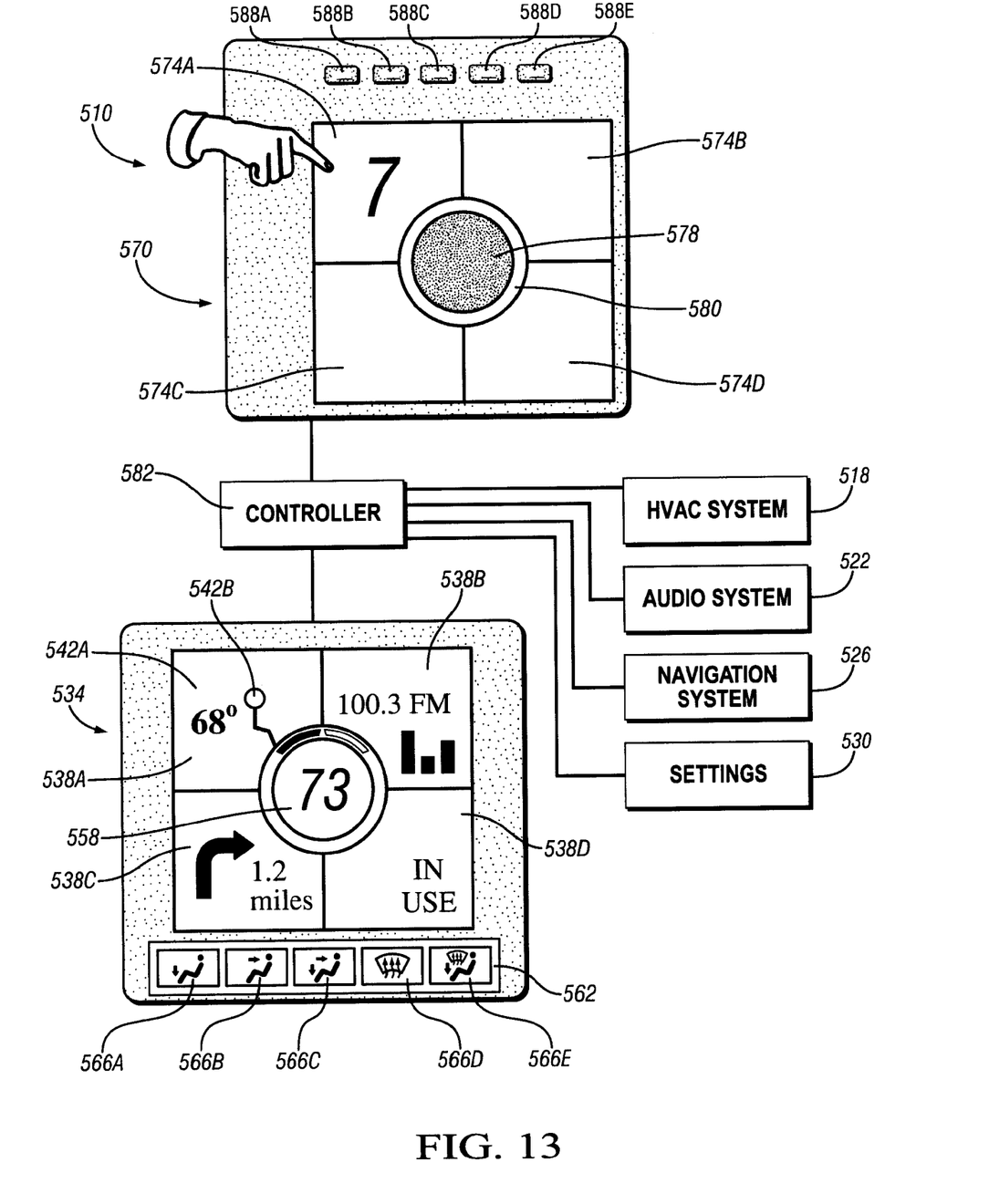

FIG. 13 shows yet another embodiment of the invention. A control system 510 is provided for a vehicle that includes a climate system 518, an audio system 522, a navigation system 526, and a driver information system 530. Each of systems 518, 522, 526, 530 has selectively variable system characteristics. For example, the climate system 518 includes components such as an air conditioner for providing cooled air, a heater for providing heated air, and ducts and vents for providing the heated or cooled air to the vehicle passenger compartment. The ducts are configured to selectively provide air to a first set of vents below an instrument panel, to a second set of vents formed inside the instrument panel and positioned to direct air generally rearward, and a third set of vents formed in the instrument panel and positioned to direct air to a windshield for use in defrosting, as understood by those skilled in the art.

The control system 510 includes a controller 582 configured to receive input signals from an interface 570 as will be discussed in detail hereinafter. The control system is configured to transmit control signals to the display 534, the climate control system 518, the audio system 522, the navigational system 526, and the driver information system 530.

The control system 510 includes a display 534 having four quadrants 538A, 538B, 538C and 538D. Each quadrant is dedicated to the display of information pertaining to a respective one of the vehicle systems 518, 522, 526, 530 when the control system 510 is in a base mode of operation. For example, quadrant 538A displays icon 542A indicating the temperature to be 68 degrees and icon 542B indicates the duct that is directing air into the passenger compartment, each of which is a variable characteristic of the climate control system 518. Quadrant 538B displays icons representing characteristics of the audio system 522. Quadrant 538C displays icons indicating variable characteristics of the navigation system 26. And quadrant 38D displays icons indicating driver information system settings.

The display 534 also depicts a circular window 558 that is situated between the quadrants 538A-D. In addition, a rectangular section 562 of the display 534 is situated underneath and below the quadrants 538A-D. Section 562 includes a plurality of icons 566A-E arranged linearly within section 562. In FIG. 13, each of icons 532A-E is representative of a particular choice of the duct outlets for the climate system 518.

The control system 510 further includes an input interface 570 consisting of gesture pads and rotary dials.

The input interface 570 includes four gesture pads 574A-D that are arranged in the same spatial relationship to one another as the quadrants 538A-D in the display 534. The input interface 570 also includes an inner rotary dial 578 and an outer rotary dial 580. The inner and outer rotary dials 578 and 580 are arranged concentrically and have the same spatial relationship with respect to buttons 574A-D as the spatial relationship window 558 has with respect to quadrants 538A-D. Buttons 588A-E protrude from surface 84, and are selectively depressible in the same fashion as the buttons 74A and 74B described hereinbefore in reference to FIG. 1.

The gesture pads 574A-D are conventional commercially available devices, one example of which is capacitive touch pad made by Cirque Corporation. The gesture pads allow the vehicle user to input a command or to input graffiti-like text on the gesture pad to input a command to the controller 582. For example, if the vehicle user taps the gesture pad 574A with a finger, the controller 582 would be commanded to be ready to modify the operating characteristics of the climate control system. Thereafter the gesture pad would function to receive graffiti-text inputs from the vehicle user. For example, FIG. 13 shows the vehicle using his finger to trace the number 7 on the gesture pad, which would then be followed by tracing the number 3 to command the controller 582 and the HVAC system 518 to change the temperature of the passenger compartment to 73 degrees. Or if desired, the vehicle user could change the temperature to 73 degrees by rotating the inner dial 578. In either case, the circular window 558 of the display 534 will display the newly selected temperature of 73 degrees. Likewise, the gesture pad 574B-D can be used to make inputs for control of the audio system 518, navigation system 526 and the driver information system 530.

While the best modes for carrying out the invention have been described in detail, those familiar with the art to which this invention relates will recognize various alternative designs and embodiments for practicing the invention within the scope of the appended claims. For example, although the drawings show the use of a four quadrant arrangement of the input interface 70 and the display unit 34, it will be understood that the invention can be employed via the use of a plurality of quadrants, such as a three quadrant or four quadrants or five quadrant arrangement. In each case, each quadrant of the input interface 70 has a corresponding screen in the display unit 34, and the physical placement of the input and the display make it easy and natural for the vehicle operator to shift his vision between the input interface and the display unit.

What is claimed:

1. A multifunction control and display system by which a vehicle operator may control multiple vehicle systems comprising:
    a display screen having a plurality of screen quadrants, and at least one display window superimposed between the quadrants; each of the screen quadrants displaying information about the operating conditions of one of the vehicle systems;
    an input interface having an input device corresponding to each of the screen quadrants of the display screen and at least one input knob located centrally of the quadrants,
    and a controller that responds to the operator actuating one of the quadrant input devices by enabling the at least one input knob to adjust an operating characteristic of the vehicle system associated with that quadrant.

2. The multifunction control and display system of claim 1 wherein the controller further causes the particular display screen quadrant that displays the information relating to that vehicle system that is adjusted by the input knob to display updated information regarding that operating characteristic that is adjusted by the operator actuation of the input knob.

3. The multifunction control and display system of claim 1 in which the display window displays information about the operating characteristic that has been most recently adjusted by actuating the knob.

4. The multifunction control and display system of claim 3 in which the input interface includes an inner knob and an outer knob by which two operating characteristics of the selected vehicle system may be adjusted.

5. The multifunction control and display system of claim 4 in which the at least one display window includes an inner window that displays information regarding the characteristic that is adjusted by the inner knob and an outer window that displays information regarding the characteristic that is adjusted by the outer knob.

6. The multifunction control and display system of claim 1 in which a plurality of auxiliary buttons are provided on the input interface and a like plurality of corresponding auxiliary display screens are provided, and the controller responds to the operator actuation of a particular input device by enabling the actuation of a selected one of the auxiliary button to select the operating characteristic that I shown on the corresponding auxiliary display screen.

7. The multifunction control and display system of claim 1 in which the input interface of each quadrant is a switch.

8. The multifunction control and display system of claim 1 in which the input interface of each quadrant is a gesture pad.

9. A multifunction control and display system by which a vehicle operator may control multiple vehicle systems comprising:
    a display screen having a plurality of screen quadrants, and at least one display window superimposed between the quadrants; each of the screen quadrants displaying information about the operating conditions of one of the vehicle systems;
    an input interface having a gesture pad input device corresponding to each of the screen quadrants of the display screen and at least one input knob located centrally of the screen quadrants,
    and a controller that responds to the operator actuating one of the quadrant input devices by enabling the at least one input knob to adjust an operating characteristic of the vehicle system associated with that quadrant.

10. The multifunction control and display system of claim 9 in which the operator may use the gesture pad to adjust the operating characteristic as an alternative to using the input knob to adjust the operating characteristic.

11. The multifunction control and display system of claim 10 in which the operator's first touch of one of the quadrant gesture pads instructs the controller to accept a next touch as an instruction to adjust an operating condition of the vehicle system corresponding to the particular quadrant and then the next touch by operator adjusts the operating condition.

12. The multifunction control and display system of claim 1 wherein the controller further causes the particular display screen quadrant that displays the information relating to that vehicle system that is adjusted by the input knob or gesture pad to display updated information regarding that operating characteristic that is adjusted by the chosen operator actuation.

13. The multifunction control and display system of claim 9 in which the input interface includes an inner knob and an outer knob by which two operating characteristics of the selected vehicle system may be adjusted.

14. The multifunction control and display system of claim 13 in which the at least one display window includes an inner window that displays information regarding the characteristic that is adjusted by the inner knob and an outer window that displays information regarding the characteristic that is adjusted by the outer knob.

\* \* \* \* \*